June 17, 1947.     A. PERONTI     2,422,254

BABY CARRIAGE

Filed Nov. 27, 1945

Inventor
Anthony Peronti,
By
Attorneys

Patented June 17, 1947

2,422,254

UNITED STATES PATENT OFFICE 2,422,254

BABY CARRIAGE

Anthony Peronti, Chicago, Ill.

Application November 27, 1945, Serial No. 631,109

1 Claim. (Cl. 280—29)

This invention relates to baby carriages, the principal object being to provide a vehicle of this class with a traction gear that will enable the person propelling the said vehicle to easily move the same over curbing between the sidewalk and street or other similar two-level surfaces that may be encountered in the path of travel.

Another object is the elimination of a chassis for the vehicle, it being pointed out that the body of the carriage is of such design and construction as to afford a rigid support for the mounting of the traction gear, thus simplifying the device and effecting a saving in the production cost.

A further object is to construct a carriage of this class that will eliminate the usual jarring of the occupant occasioned by the passing of the vehicle over uneven surfaces or obstacles and that will permit the body of said carriage to maintain a substantially horizontal position at all times.

In the accompanying drawing—

At 1 is shown the body of the carriage, which is preferably constructed of sheet metal and is formed by stamping or welding or a combination of both. The said body is of "torpedo" design or streamlined, both for appearance and to give maximum rigidity with a minimum of weight since this requires no additional bracing or reinforcement. The upper side of the body proper has the usual opening such as shown at 2, to permit the passenger to be placed in or removed from the carriage. Attached to the forward part of the body and arranged to cover substantially half of the opening 2, is a hood or canopy 3 to protect the occupant from sun glare or inclement weather.

Figure 1:
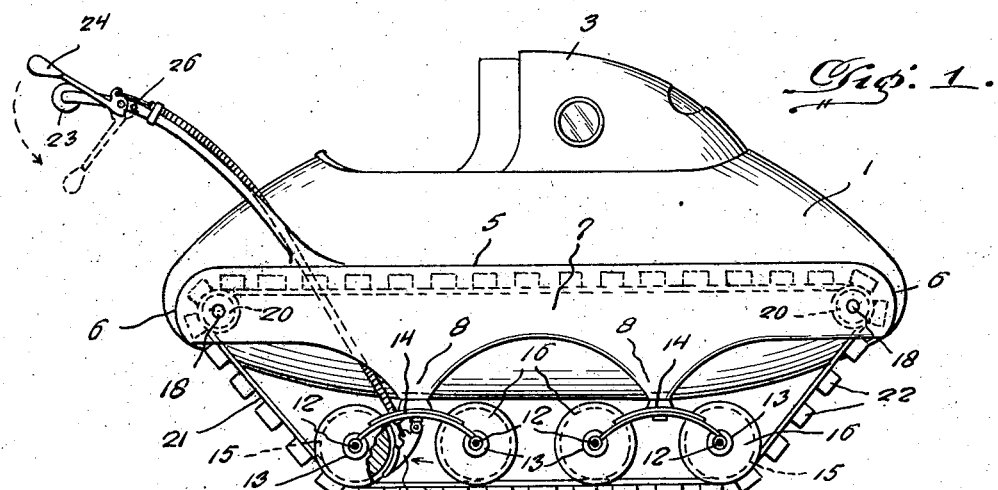
Figure 1 shows a side elevation of a baby carriage constructed in accordance with my invention.
Figure 2:
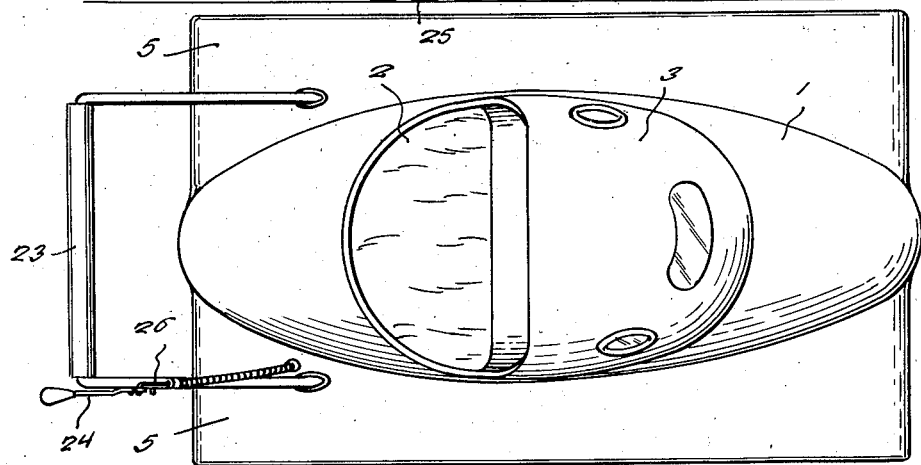
Figure 2 is a top plan view of the same.
Figure 3:
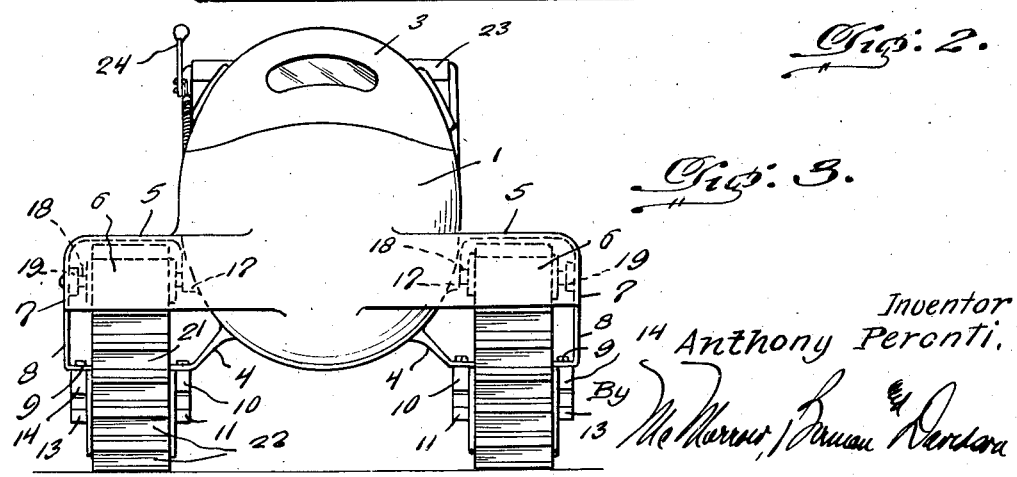
Figure 3 is a front elevation.

Attached to the body by welding or other suitable process are brackets, seen at 4 in Figure 3. These brackets are arranged in pairs, one of said pairs being forward and the other to the rearward of the longitudinal center of the body and project outwardly and downwardly from the rounded underside of said body. About midway of the height of the body and extending along either side thereof for approximately its full length, are sheet metal guards or fenders 5 which also are attached to the body by welding. At their front and rear extremities the fenders are curved downwardly as at 6 while the outer sides are bent to form side walls 7. On each of the side walls at points relatively corresponding to the brackets 4 is formed a pair of downward extensions 8, each of which is bent inwardly as at 9 at a point in horizontal alignment with its respective bracket. Secured at its center to each of the brackets 4 is a cushion spring 10 the main leaf of which has formed on each of its extremities a bearing 11 into which fits one end of a horizontal shaft 12, the opposite end of which is carried by a bearing 13 formed on a similar spring 14 bolted to the inturned portion 9 of the side wall. Mounted to rotate on each shaft 12 is a roller 15 having a flange 16 formed on either end.

Adjacent either end of the body and on opposite sides thereof is a bearing indicated at 17 which carries one end of a shaft 18, the opposite end of said shaft being carried by a bearing 19 formed on the inner side of the side wall. Mounted for rotation on each shaft is a roller 20 corresponding in length to the rollers shown at 15 and being similarly flanged. An endless, flexible belt 21 on the rollers 15 and 20 is held in place by the flanges of said rollers. Treads 22 formed of blocks of soft rubber or other suitable material are attached at close intervals to the belt 21. As will be seen from the foregoing, an endless tread is thus provided, the flanged rollers 15 acting as the traction wheels which run upon the endless track formed by the belt 21 as the vehicle is moved forward and beakward.

A handle for propelling the carriage is shown at 23 and pivoted at one side of said handle is a control lever 24. Mounted for engagement with the rearmost of the rollers 15 is a brake shoe 25 which is attached to the lever 24 by a flexible rod 26. Movement of the lever will bring the brake shoe into contact with the adjacent roller.

With the above described construction I have provided a baby carriage which will move easily and quietly over any type of surface and by virtue of the flexibility of the springs 10 and 14, curbstones, door-steps and other minor obstacles can be negotiated without tilting the body of the carriage and with a minimum of jarring or discomfort to the passenger.

Having now described my invention, what I claim is:

An endless tread vehicle comprising a self-reinforced body, a fender attached to either side of said body and extending longitudinally therewith, a pair of longitudinally spaced downwardly extending portions on each of said fenders, a bracket attached to said body at a point in transverse alignment with each of said downwardly extending portions, a spring attached to each of said brackets and a similar spring attached to each of said downwardly extending portions, each of said second mentioned springs forming a pair with the spring on its aligned bracket, an endless belt tread mechanism, and rollers mounted for rotation between each of said pairs of springs and arranged to carry the endless belt.

ANTHONY PERONTI.

REFERENCES CITED

The following references are of record in the file of this patent:

UNITED STATES PATENTS

| Number | Name | Date |
|---|---|---|
| 1,590,696 | Orr | June 29, 1926 |
| 2,376,720 | Pflager | May 22, 1945 |